United States Patent
Varadarajan

(10) Patent No.: US 9,692,797 B2
(45) Date of Patent: Jun. 27, 2017

(54) COLLABORATIVE BROWSING ON A NETWORK SITE

(71) Applicant: Amazon Technologies, Inc., Reno, NV (US)

(72) Inventor: Anand Varadarajan, Bellevue, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 620 days.

(21) Appl. No.: 14/283,779

(22) Filed: May 21, 2014

(65) Prior Publication Data

US 2014/0258888 A1   Sep. 11, 2014

Related U.S. Application Data

(62) Division of application No. 13/040,484, filed on Mar. 4, 2011, now Pat. No. 8,739,044.

(51) Int. Cl.
*G06F 3/0481* (2013.01)
*H04L 29/06* (2006.01)
*G06Q 30/06* (2012.01)

(52) U.S. Cl.
CPC .......... *H04L 65/403* (2013.01); *G06F 3/0481* (2013.01); *G06Q 30/0643* (2013.01)

(58) Field of Classification Search
CPC .................................................... G06F 3/0481
USPC ........................................................ 715/751
See application file for complete search history.

(56) References Cited

U.S. PATENT DOCUMENTS

| | | | | |
|---|---|---|---|---|
| 6,732,145 B1 * | 5/2004 | Aravamudan | .... | G06F 17/30873 707/E17.111 |
| 7,617,016 B2 * | 11/2009 | Wannier | ................. | A41H 3/007 700/132 |
| 7,802,197 B2 * | 9/2010 | Lew | ...................... | G06F 9/4443 715/707 |
| 7,805,337 B1 * | 9/2010 | Ogg | ................... | G06F 17/30873 705/26.1 |
| 7,908,325 B1 * | 3/2011 | Pabla | ...................... | G06F 9/542 709/205 |
| 8,090,465 B2 * | 1/2012 | Zeng | ...................... | G06F 19/00 700/132 |
| 2004/0083142 A1 * | 4/2004 | Kozzinn | .................. | A41H 1/00 705/26.5 |
| 2005/0198116 A1 * | 9/2005 | Appleman | ........ | G06F 17/30873 709/203 |

(Continued)

OTHER PUBLICATIONS

U.S. Appl. No. 12/774,013, filed May 5, 2010, and entitled "Visualization of Fit, Flow, and Texture of Clothing Items by Online Consumers".

*Primary Examiner* — Reza Nabi
(74) *Attorney, Agent, or Firm* — Thomas | Horstemeyer, LLP

(57) ABSTRACT

Disclosed are various embodiments for facilitating collaborative browsing of a network site by multiple users. A user interface is rendered by a computing device, and the user interface facilitates participation in a collaborative browsing session by multiple users including a master user and one or more other users. The user interface includes a browsing window that facilitates browsing of a network site by the master user. An indication of a status change of the browsing window is sent to another computing device when the computing device corresponds to a client in use by the master user.

20 Claims, 10 Drawing Sheets

(56) References Cited

U.S. PATENT DOCUMENTS

| | | | |
|---|---|---|---|
| 2005/0234782 A1* | 10/2005 | Schackne | G06Q 30/0601 705/26.1 |
| 2006/0020681 A1* | 1/2006 | DePree | G06F 17/2247 709/217 |
| 2007/0198120 A1* | 8/2007 | Wannier | A41H 3/007 700/138 |
| 2008/0163054 A1* | 7/2008 | Pieper | G06F 19/3437 715/706 |
| 2009/0049389 A1* | 2/2009 | Kuzmanovic | G06F 9/4443 715/745 |
| 2009/0106674 A1* | 4/2009 | Bray | G06F 17/30112 715/762 |
| 2009/0116698 A1* | 5/2009 | Zhang | G06K 9/00362 382/111 |
| 2009/0276291 A1* | 11/2009 | Wannier | G06Q 30/0269 705/14.66 |
| 2009/0313544 A1* | 12/2009 | Wood | G06F 3/048 715/716 |
| 2010/0023421 A1* | 1/2010 | Wannier | A41H 3/007 705/26.1 |
| 2010/0049633 A1* | 2/2010 | Wannier | G06Q 30/0603 705/26.1 |
| 2010/0082746 A1* | 4/2010 | Ulrich | G06F 17/30873 709/204 |
| 2010/0082747 A1* | 4/2010 | Yue | G06F 17/30873 709/204 |
| 2010/0083132 A1* | 4/2010 | Ulrich | H04L 67/104 715/751 |
| 2010/0083135 A1* | 4/2010 | Zawacki | G06F 17/30873 715/753 |
| 2011/0178889 A1* | 7/2011 | Abraham | G06Q 10/10 705/26.1 |
| 2011/0184832 A1* | 7/2011 | Wannier | G06Q 30/0269 705/26.7 |
| 2011/0218664 A1* | 9/2011 | Zeng | G06F 19/00 700/132 |
| 2013/0024268 A1* | 1/2013 | Manickavelu | G06Q 30/0601 705/14.39 |
| 2013/0138479 A1* | 5/2013 | Mohan | G06Q 10/10 705/7.33 |
| 2014/0372906 A1* | 12/2014 | Campbell | G06Q 10/101 715/753 |

* cited by examiner

COLLABORATIVE BROWSING ON A NETWORK SITE

CROSS-REFERENCE TO RELATED APPLICATIONS

This application is a divisional of co-pending U.S. Patent Application entitled "COLLABORATIVE BROWSING ON A NETWORK SITE," having Ser. No. 13/040,484, and filed Mar. 4, 2011, which is incorporated herein by reference in its entirety.

BACKGROUND

Groups of friends may like to go shopping together in shopping malls, department stores, and/or in other brick-and-mortar retail stores. Each may want the opinions of the others regarding the products they are examining or trying on prior to purchasing the products. In the context of an online retail store, a customer may copy a uniform resource locator (URL) of a network page that describes a product and send the URL in an email to one or more friends. The friends may then pull up the network page referenced by the URL in a browser, view the product information, and give an opinion in a return email to the customer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to collaborative browsing of network sites by multiple users. When a user is browsing a network site and finds a network page that is interesting, the user may wish to have friends take a look at the network page. In the case of online shopping, a user may be viewing a detail network page regarding an item offered for sale. Often, the user would like to have friends or family comment on the item before the user purchases it. Various embodiments of the present disclosure include a collaborative browsing interface for multiple users that includes a browsing window. In some embodiments, the collaborative browsing interface is customized for a collaborative shopping experience. A master user is able to browse a network site in the browsing window, and changes to the browsing window of the master user are replicated to the browsing windows of the other users. The collaborative browsing interface may further include components that facilitate communication among the users. In the following discussion, a general description of the system and its components is provided, followed by a discussion of the operation of the same.

Figure 1:
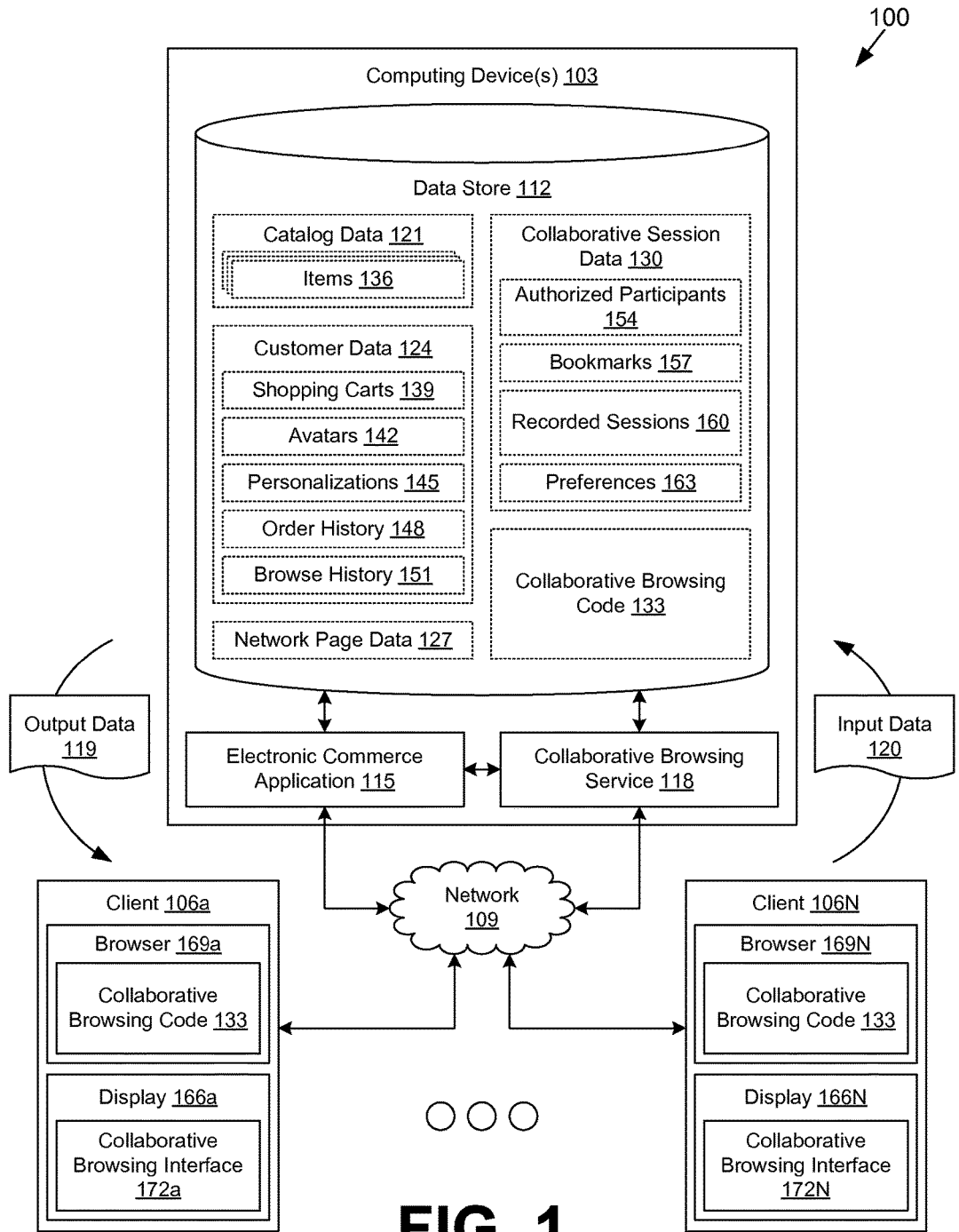
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of clients 106a . . . 106N by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include an electronic commerce application 115, a collaborative browsing service 118, and other applications, services, processes, systems, engines, or functionality not discussed in detail herein. The electronic commerce application 115 is executed in order to facilitate the online purchase of items over the network 109. The electronic commerce application 115 also performs various backend functions associated with the online presence of a merchant in order to facilitate the online purchase of items. For example, the electronic commerce application 115 may generate network pages or portions thereof that are provided to clients 106 for the purposes of selecting items for purchase, rental, download, lease, or other forms of consumption.

The collaborative browsing service 118 is executed to maintain collaborative browsing sessions that each may involve multiple users. To this end, the collaborative browsing service 118 may facilitate the selection and invitation of users by a master user, or leader, to join a collaborative browsing session. Further, the collaborative browsing service 118 may generate, or send code that facilitates the generation of, user interfaces in the client 106 that enable the master user to browse a network site through a browsing window and to present the other users with the browsing window as controlled by the master user. In addition, the collaborative browsing service 118 may also facilitate communication among the users in a collaborative browsing session by way of one or more components in the user interface.

The electronic commerce application 115 and the collaborative browsing service 118 are configured to send output data 119 to the clients 106 and obtain input data 120 from the clients 106. The output data 119 may include, for example, data relating to network pages or portions of network pages, audio data, image data, video data, etc. The input data 120 may include, for example, requests for network pages, network site browsing data, audio data, image data, video data, etc.

The data stored in the data store 112 includes, for example, catalog data 121, customer data 124, network page data 127, collaborative session data 130, collaborative browsing code 133, and potentially other data. The catalog data 121 may include information related to a plurality of items 136 offered through a network site hosted by the electronic commerce application 115. An item 136 may refer to a product, good, service, software download, multimedia download, social networking profile, or any combination, bundle, or package thereof, that may be offered for sale, purchase, rental, lease, download, and/or any other form of consumption as may be appreciated. The various data stored in catalog data 121 may include, for example, titles, descriptions, quantities, conditions, dimensions, images, options, weights, customer reviews, customer ratings, keywords, shipping restrictions, prices, tax classifications, unique identifiers, and any other data related to items 136.

The customer data 124 includes various data relating to customers of the network site hosted by the electronic commerce application 115. The customer data 124 may include, for example, shopping carts 139, avatars 142, personalizations 145, order history 148, browse history 151, and/or other data. Each shopping cart 139 includes a listing of zero or more items 136 that customers have placed in their respective shopping cart 139 through interaction with the electronic commerce application 115. Although a shopping cart 139 may ordinarily be accessed only by the customer with which it is associated, multiple customers may be able to access a shopping cart 139 in some embodiments. Further, it may be the case that a customer has multiple shopping carts 139, one on each of multiple clients 106 operated by the customer, for example. The customer data 124 may include data relating to other types of lists of items 136 such as, for example, gift registries, wish lists, saved lists, lists of favorite items 136, and/or other lists.

The customer data 124 may include data relating to avatars 142, which may correspond to graphical representations associated with the customer. As a non-limiting example, an avatar 142 could correspond to a cartoon-type or other generic character selected by the customer. As another non-limiting example, an avatar 142 could correspond to a character that has been customized for the customer using dimensions and other characteristics supplied by the customer. U.S. patent application Ser. No. 12/774,013, filed on May 5, 2010, and entitled "Visualization of Fit, Flow, and Texture of Clothing Items by Online Consumers," which is incorporated herein by reference in its entirety, further discusses the concept of customized avatars 142 for customers. In still other non-limiting examples, the avatar 142 could correspond to houses, rooms, vehicles, furniture, pets, and/or any other thing that may be represented graphically and correspond to the customer.

The personalizations 145 may relate to any type of customization that may be applied to content served up by the electronic commerce application 115 and/or the collaborative browsing service 118. The personalizations 145 may be explicitly specified by the customer by way of configuration tasks and settings. Alternatively, the personalizations 145 may be implicitly determined based on customer behavior, order history 148, browse history 151, demographic data, and/or other factors. Thus, the personalizations 145 may be determined according to a history of interactions of a user with the electronic commerce application 115 and/or other applications that serve up a network site. As non-limiting examples, the personalizations 145 may specify favorite items 136 or favorite categories of items 136 for each customer, preferred color schemes or network page layouts, preferred payment instruments and checkout customizations, and so on.

The order history 148 describes a history of orders for items 136 placed by each customer. The browse history 151 describes a history of each customer browsing through one or more network sites served up by the electronic commerce application 115 and/or the collaborative browsing service 118. The order history 148 and/or the browse history 151 may be used in some embodiments in the automatic generation of the personalizations 145.

The network page data 127 includes various data used by the electronic commerce application 115 and/or the collaborative browsing service 118 in serving up network pages and/or portions of network pages. To this end, the network page data 127 may include text, templates, code, images, audio, video, cascading style sheets (CSS), hypertext markup language (HTML), extensible markup language (XML), extensible style sheet language transformations (XSLT), and/or other data.

The collaborative session data 130 includes data relating to current or previous collaborative browsing sessions facilitated by the collaborative browsing service 118. For example, the collaborative session data 130 may include data relating to authorized participants 154, bookmarks 157, recorded sessions 160, preferences 163, and/or other data. The authorized participants 154 correspond to friends, family, and/or other individuals associated with a customer who are authorized to participate in a collaborative browsing session initiated by the customer. Each authorized participant 154 may be associated with default or specific permissions that enable functionality within the collaborative browsing session. For instance, one or more authorized participants 154 may have permission to become the leader of the collaborative browsing session that was established by another. While some authorized participants 154 may be customers who have registered through the electronic commerce application 115, other authorized participants 154 may be associated with only basic information (e.g., name, email, etc.) that has been provided by the leader of the collaborative browsing session.

The bookmarks 157 may include saved network pages and/or saved items 136 that have been designated to be saved in the course of a collaborative browsing session. Such bookmarks 157 may be accessible through a user interface associated with a collaborative browsing session, through summaries provided on a network page, email, and/or text message, and/or through other channels of communication. The recorded sessions 160 may correspond to saved recordings of collaborative browsing sessions. The recorded sessions 160 may include a listing of links that represent the network pages that have been visited during a collaborative browsing session. The recorded sessions 160 may include recorded text, audio, and/or video that corresponds to communication among users that participated in a collaborative browsing session. The recorded sessions 160 may correspond to recordings of entire collaborative browsing sessions or portions of collaborative browsing sessions. The preferences 163 may include configuration parameters that control various aspects of the collaborative browsing session. Non-limiting examples of the preferences 163 may include invitation settings, privacy settings, recording settings, communication settings, session management settings, and/or other types of settings.

The collaborative browsing code 133 corresponds to client-side code that is configured to render a user interface that facilitates participation in a collaborative browsing session. The collaborative browsing code 133 is configured to render a user interface that permits a master user in a collaborative browsing session to browse a network site in one client 106. In other clients 106, the other users who are participating in the collaborative browsing session are able to view the network pages of the network site which are being visited by the master user. The collaborative browsing code 133 may include both capabilities associated with master users and other users. Furthermore, the collaborative browsing code 133 may include code that renders a user interface that facilitates communication between the users of a collaborative browsing session. The collaborative browsing code 133 may correspond to a client application, a browser plug-in, JavaScript code, VBScript code, and/or other forms of client-side code. In one embodiment, where the user is not the master user, the collaborative browsing code 133 may correspond to HTML code that is configured to refresh a browser window. In this way, a sequence of network pages accessed by the master user may be rendered in the browser window(s) of the other user(s).

Each client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each client 106 may include a display 166. The display 166 may comprise, for example, one or more devices such as cathode ray tubes (CRTs), liquid crystal display (LCD) screens, gas plasma-based flat panel displays, LCD projectors, or other types of display devices, etc.

Each client 106 may be configured to execute various applications such as a browser 169 and/or other applications. The browser 169 may be executed in a client 106, for example, to access and render network pages, such as web pages, or other network content served up by the computing device 103 and/or other servers as output data 119. The browser 169 may download and execute the collaborative browsing code 133 from the collaborative browsing service 118 in order to generate a respective collaborative browsing interface 172 on the display 166. The client 106 may be configured to execute applications beyond browser 169 such as, for example, email applications, instant message applications, and/or other applications.

Next, a general description of the operation of the various components of the networked environment 100 is provided. To begin, a user at a client 106 establishes a collaborative browsing session. The user may specify contacts who are to be invited to participate. In other embodiments, pre-established sessions may be open for anyone to join before any users are identified, and the user may join an existing open session. Invitations are sent to the users to join, and one or more users subsequently join.

The collaborative browsing code 133 is sent to each of the users if it is not otherwise stored or cached on the client 106 of the respective user. The browser 169 executes the collaborative browsing code 133, and a collaborative browsing interface 172 is generated and rendered on each client 106. In some embodiments, a client application separate from the browser 169 may generate the collaborative browsing interface 172.

The collaborative browsing interface 172 includes a component that facilitates browsing of a network site by a leader of the session. Whenever the status of the browsing component changes, an update is sent to the other clients 106. Such an update may be sent in a peer-to-peer approach or may be sent to the collaborative browsing service 118 for relay to the other participating clients 106.

As a non-limiting example, the leader may load a detail network page regarding an item 136 for sale. The other clients 106 are then instructed to load the same detail network page. Next, the leader may hover a cursor over an image of the item 136, causing the image to be swapped out for another image of the item 136. The hovering and image swapping may then be replicated on the other clients 106. It is noted that the browsing updates may be sent without sending graphical data (e.g., screen capture data) to the clients 106. Whenever the document object model (DOM) is modified in the client 106 of the leader, the change may then be replicated to the other clients 106.

In one embodiment, avatars 142 associated with the leader may be displayed in association with the collaborative browsing interface 172. As a non-limiting example, the avatar 142 may be generated based on specific body dimensions and/or other characteristics of the master user, and the avatar 142 may be depicted as wearing a clothing item 136 that is described on a network page rendered in the collaborative browsing interface 172. As another non-limiting example, the avatar 142 may correspond to the living room of the master user, with various pieces of furniture and décor arranged as in the actual living room. The avatar 142 may then depict a décor item 136 in use within the graphical representation of the living room.

The collaborative browsing interface 172 may also facilitate communication among the users who are participating within the session. Such communication may occur through text chat, voice chat, video chat, and/or other channels. Accordingly, the other users may comment on the items 136 or network pages that are being viewed and considered by the master user. The collaborative browsing interface 172 may also facilitate recording of the session for later retrieval by one or more of the participants. For instance, the recorded sessions 160 may include an audio recording of the session in conjunction with a listing of links that correspond to items 136 viewed during the session.

The leader and/or other users may add items 136 depicted in the collaborative browsing interface 172 to shopping carts 139 and/or other lists. As a non-limiting example, the leader may initiate the purchase of an item 139 that has been recommended by friends who are participating in the session. As another non-limiting example, suppose that a college student and her parents are browsing a network site of an online retailer. The college student may be the leader of the session, and her parents may correspond to another participant. Upon her direction, her parents may add a particular item 136 to their shopping cart 139 and place an order for the item 136.

Figure 2:
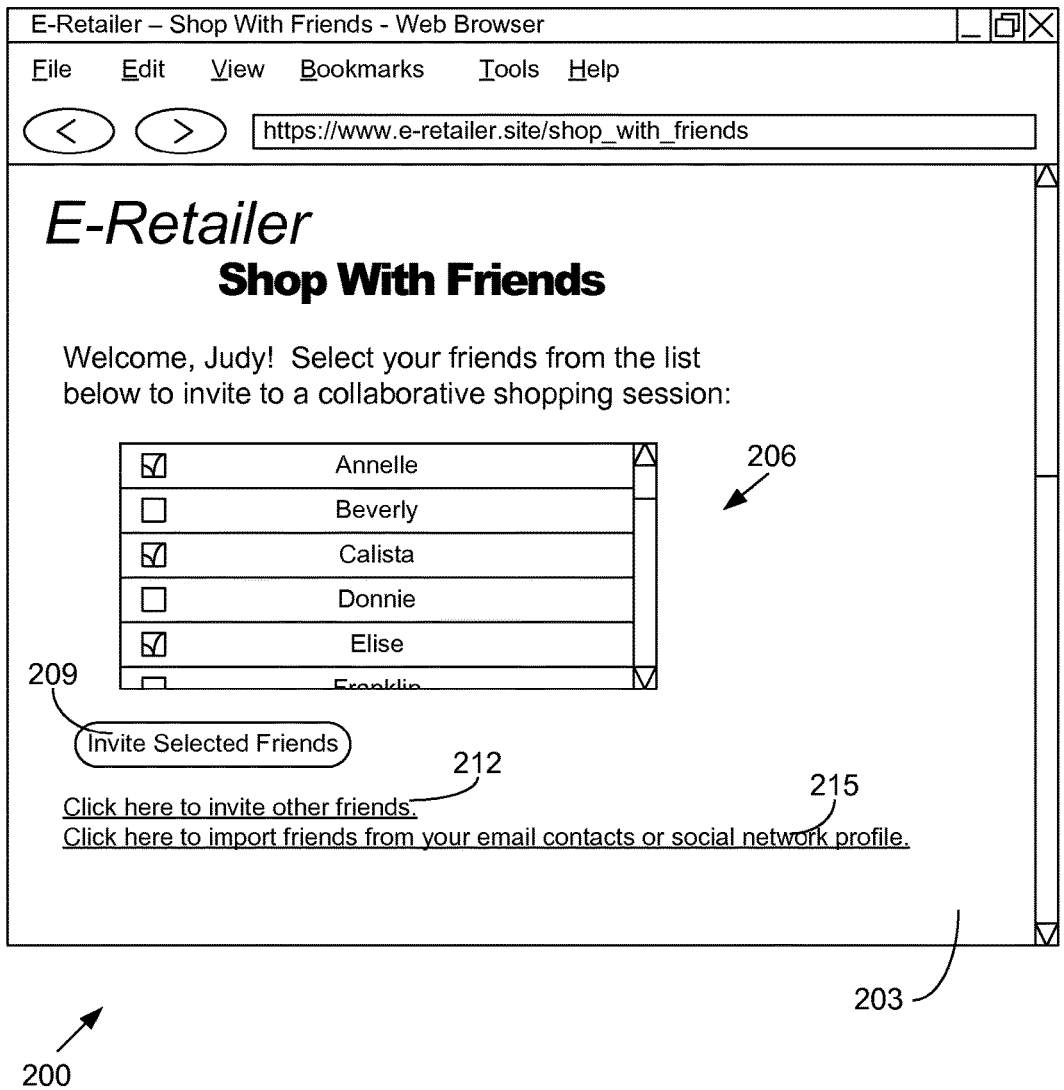
FIGS. 2-6 are drawings of examples of user interfaces rendered by a client in the networked environment of FIG. 1 according to various embodiments of the present disclosure.

Referring next to FIG. 2, shown is one example of a user interface 200 generated by a browser 169 (FIG. 1) executed in a client 106 (FIG. 1) in the networked environment 100 (FIG. 1). Specifically, FIG. 2 depicts a rendered network page 203 that allows a user to invite other users to participate in a collaborative browsing session. In this example, a list of contacts 206 is provided that allows the user to select contacts (e.g., friends, family, acquaintances, expert shoppers, etc.) to be invited to participate in a collaborative browsing session led by the user or another user. Although the list of contacts 206 is illustrated as a scrolling list of checkboxes, it is understood that other user interface components may be used in other embodiments.

In this example, at least three contacts are selected (e.g., "Annelle," "Calista," and "Elise") while other contacts remain unselected (e.g., "Beverly," "Donnie," etc.). In some embodiments, some contacts may be preselected, and the user may choose to deselect the preselected contacts. When the user selects the invitation initiation component 209, the selection of the contacts is submitted to the collaborative browsing service 118 (FIG. 1), which may then initiate the sending of invitations to the selected ones of the contacts. When contacts are invited to participate in a collaborative browsing session, they may be added to the authorized participants 154 (FIG. 1) for the particular session.

Although the list of contacts 206 may contain, for example, contacts which are saved and stored in the customer data 124 (FIG. 1), other approaches may be used for selecting and inviting other contacts. For example, links 212 and 215 are shown as providing two other approaches to selecting and inviting contacts. Link 212 reads, "Click here to invite other friends," which may lead the user to another user interface where the user may input details regarding other contacts such as, for example, names, email addresses, telephone numbers, and so on. Link 215 reads, "Click here to import friends from your email contacts or social network profile," which may lead the user to another user interface where the user may provide login information for other accounts from which the collaborative browsing service 118 may automatically obtain information relating to contacts.

Figure 3:
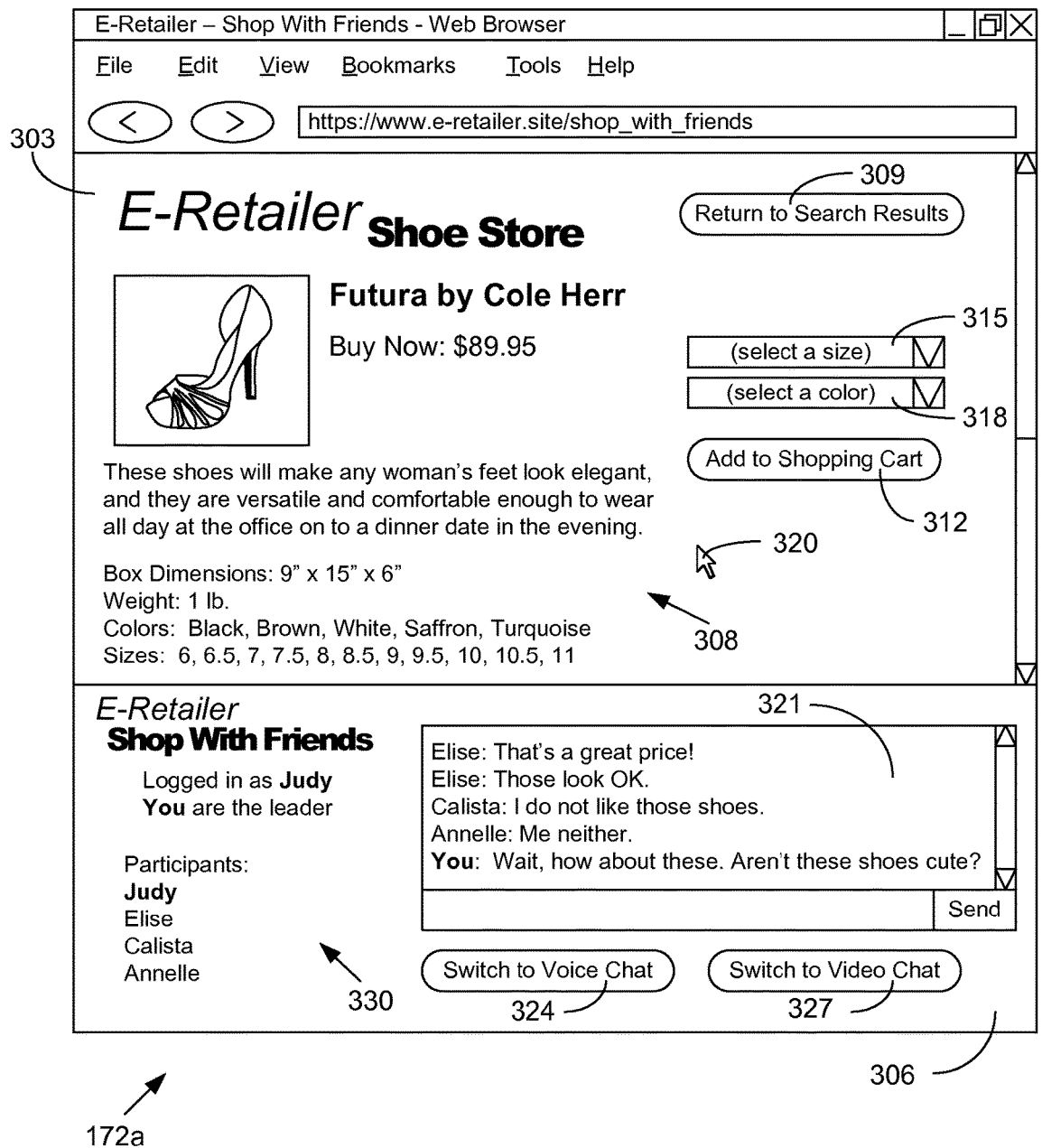

Turning now to FIG. 3, shown is one example of a collaborative browsing interface 172a rendered by a browser 169 (FIG. 1) executed in a client 106 (FIG. 1) in the networked environment 100 (FIG. 1). In particular, the example of FIG. 3 represents a collaborative browsing interface 172a as seen by a leader of a collaborative browsing session. The collaborative browsing interface 172a includes a browsing window 303 and a communication window 306, which are each represented as respective panels or portions of the graphical interface associated with the browser 169. In other embodiments, the browsing window 303 and the communication window 306 may be separate windows of the browser 169 rather than merely portions of windows.

The browsing window 303 corresponds to a browsing interface that enables the master user of the collaborative browsing session to browse a network site. To this end, the browsing window 303 may render a sequence of network pages of the network site at the direction of the master user. In this example, the browsing window 303 is rendering a detail network page that relates to an item 136 (FIG. 1) offered for ordering through a network site of an online retailer. The browsing window 303 may include item descriptive content 308, such as titles, images, prices, descriptions, etc. relating to the item 136. The browsing window 303 may include a search result navigational component 309, an item list management component 312, an item size selection component 315, an item color selection component 318, and/or other user interface components. It is noted that the browsing window 303 may be personalized for the master user based upon order history 148 (FIG. 1), browse history 151 (FIG. 1), and/or other data relating to a history of interactions of the master user with the network site. To this end, the browsing window 303 may include, for example, that recommends items 136 to the master user based on past purchases, past browsing behavior, and so on.

The search result navigational component 309 enables the master user to return to a listing of search results, where the currently rendered network page relates to a listing of search results. Other components may be provided to move back and forth within a search result listing, where applicable. The item list management component 312 may allow the user to add the item 136 to a shopping cart 139 (FIG. 1) or another list of items 136 such as a wish list, gift registry, list of bookmarked or saved items 136, etc. In one embodiment, any user that participates may be able to add the item 136 to his or her corresponding personal shopping cart 139 or another list. In another embodiment, any participating user with permission may be able to add the item 136 to the shopping cart 139 or another list of the master user. In one embodiment, adding an item 136 to a shopping cart 139, checking out, and so on may be considered private actions which would not result in other users participating in the collaborative browsing session seeing the shopping cart, list, order completion interface, etc.

In the example of FIG. 3, an item size selection component 315 and an item color selection component 318 are provided to allow the user to select options for the item 136 such as size, color, quantity, warranty, etc. before adding the item 136 to a list such as a shopping cart 139. Although the item size selection component 315 and the item color selection component 318 are depicted as drop-down boxes, it is understood that other types of user interface components may be used in other embodiments.

The browsing window 303 may include a cursor 320 which may be controlled by the current leader of the collaborative browsing session. To this end, the movements of the cursor 320 may be replicated to the browsing windows 303 rendered in other clients 106 that are participating in the collaborative browsing session. The cursor 320 may correspond directly to a pointer or other indicator associated with an input device controlled by the leader of the collaborative browsing session. The cursor 320 may be used to point at and/or select various components in the browsing window 303.

The communication window 306 may allow users who are participating in a collaborative browsing session to be able to communicate with one another. To this end, the communication window 306 includes a text communication interface 321 that permits a user to type a message and have the message relayed to the other users participating in the session. A voice chat component 324 and a video chat component 327 may be included to launch audio and/or video communications capabilities in the collaborative browsing interface 172a.

The communication window 306 may also include a listing of participants 330 in the collaborative browsing session. Here, the listing of participants 330 indicates that "Judy," "Elise," "Calista," and "Annelle" are participating in the collaborative browsing session. The listing of participants 330 may indicate the identity of the user at the current client 106 on which the collaborative browsing interface 172a is rendered (e.g., "Judy"), and the identity of the user who is the leader of the collaborative browsing session (e.g., "You").

Figure 4:
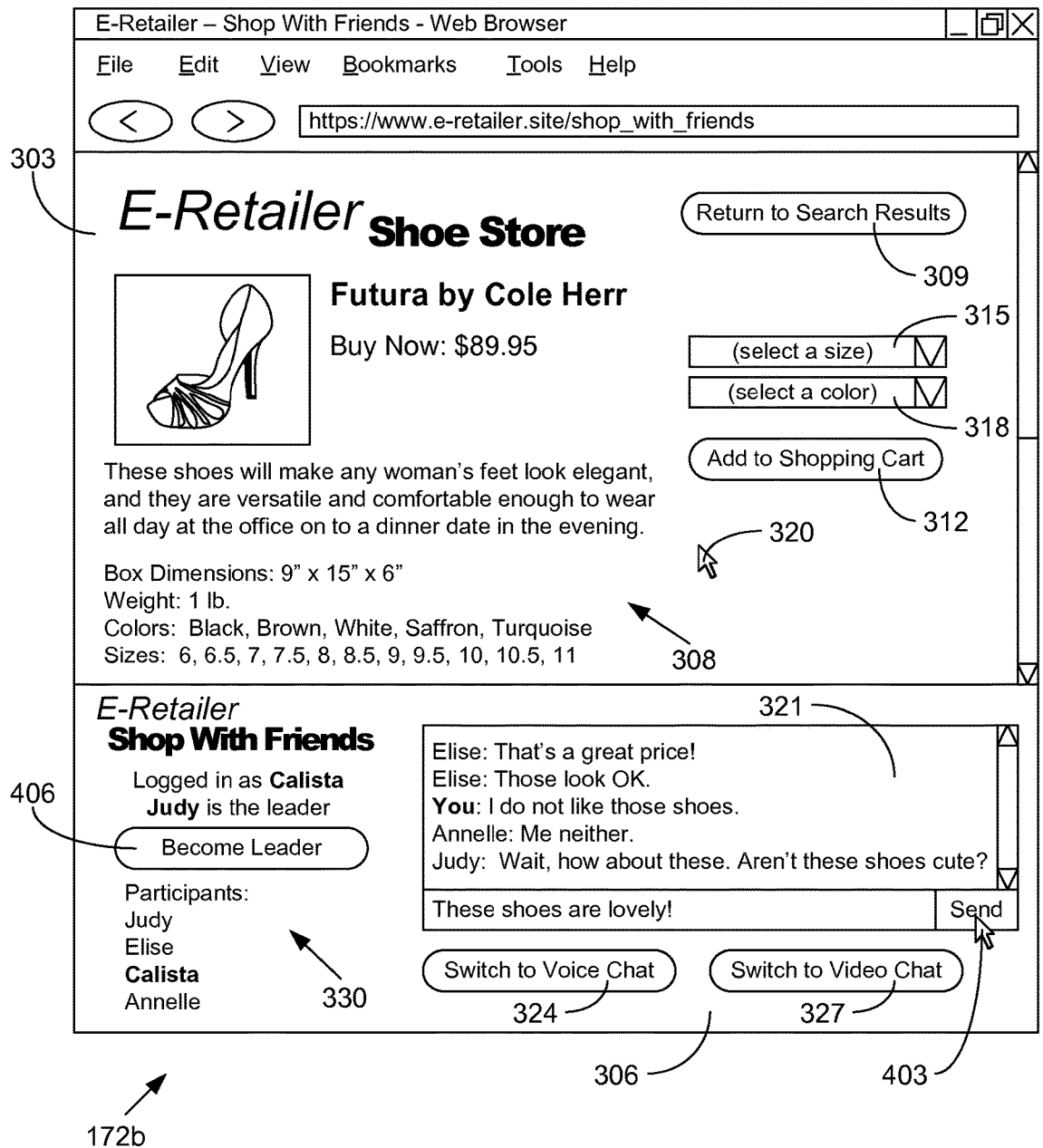

Moving on to FIG. 4, shown is another example of a collaborative browsing interface 172b rendered by a browser 169 (FIG. 1) executed in a client 106 (FIG. 1) in the networked environment 100 (FIG. 1). In particular, the example of FIG. 4 represents a collaborative browsing interface 172b as seen by another participant of the collaborative browsing session described in connection with the example of FIG. 4. The browsing window 303 generally includes the same content as the browsing window 303 shown in FIG. 4. However, in FIG. 4, the local user is not in control of the browsing of the network site that is rendered in the browsing window 303. Further, the cursor 320 does not correspond to the local cursor 403. In this example, the local user has moved the local cursor 403 over the communication window 306, yet the cursor 320 still persists over the browsing window 303.

The text communication interface 321 and the listing of participants 330 have been updated to reflect the different user. In this example, "Calista" is identified as the current user, while "Judy" is identified as the leader of the collaborative browsing session. In addition, a leader control component 406 is provided to enable the current user to become the leader of the collaborative browsing session. In some embodiments, such a leader control component 406 may be absent or may appear based in part on configuration preferences 163 (FIG. 1). For instance, a user may have explicit authorization to become the leader, or the change in leaders may be initiated by the current leader.

Figure 5:
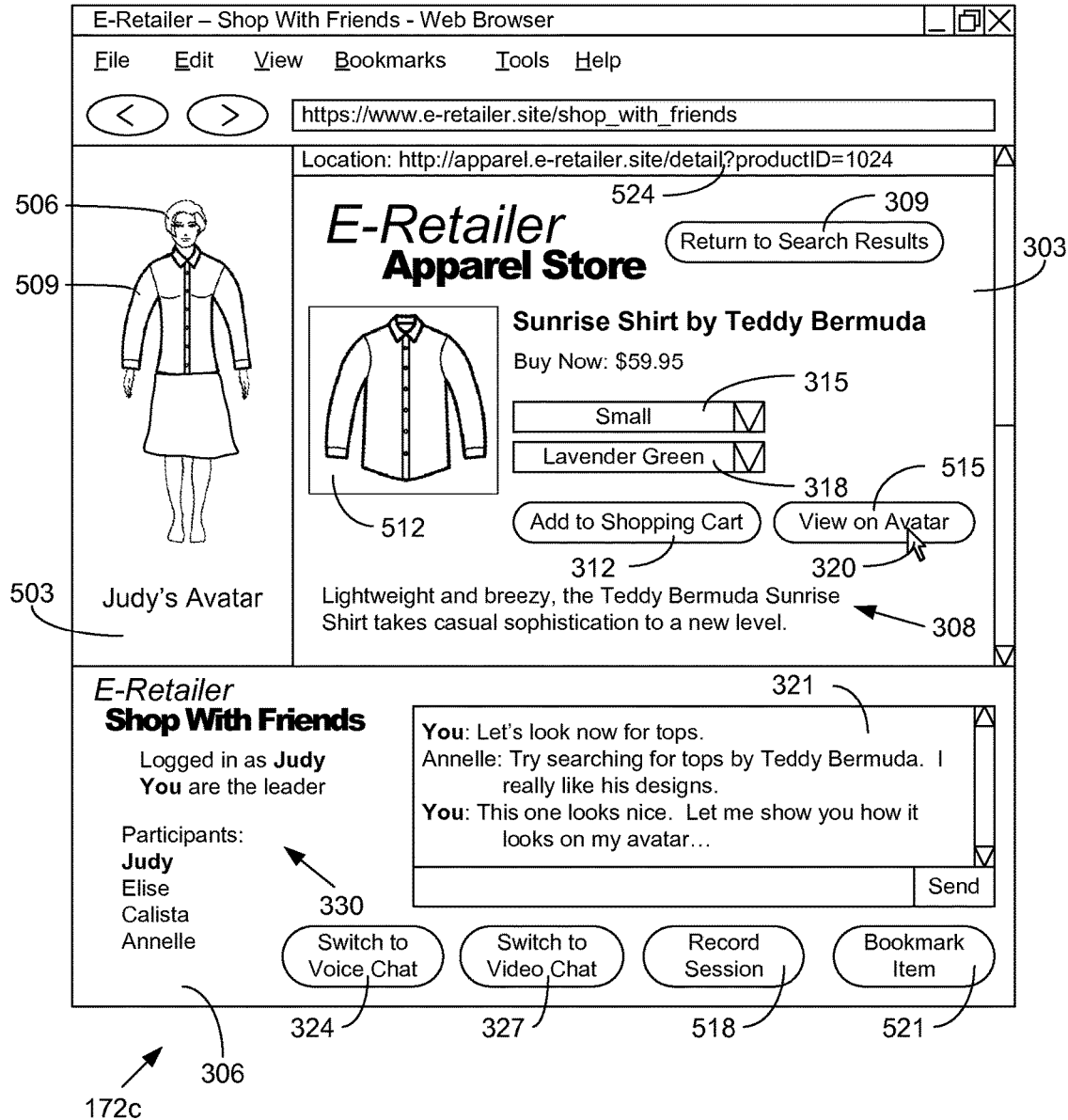

With reference to FIG. 5, shown is another example of a collaborative browsing interface 172c rendered by a browser 169 (FIG. 1) executed in a client 106 (FIG. 1) in the networked environment 100 (FIG. 1). In particular, the example of FIG. 5 represents a collaborative browsing interface 172c rendered in the client 106 controlled by the leader of the collaborative browsing session. Unlike FIG. 3, FIG. 5 includes an avatar window 503 showing a graphical representation 506 of the leader using the item 136 (FIG. 1) described by a network page rendered in the browsing window 303. Although the avatar window 503 is shown as a panel or component of the collaborative browsing interface 172c, the avatar window 503 may be a separate window in other embodiments.

The graphical representation 506 may correspond to an avatar 142 (FIG. 1). In this example, the graphical representation 506 of the leader includes a graphical representation 509 of the item 136. Because the item 136 is an apparel item 136, the leader is shown as wearing the item 136. The item 136 is also shown in an image 512 in the browsing window 303. The browsing window 303 also includes an avatar launch component 515, which may launch the display of the avatar 142 in the avatar window 503. In other embodiments, the avatar 142 may be customarily included in the collaborative browsing interface 172c.

The communication window 306 in this example also includes a record session component 518 and a bookmark item component 521. The record session component 518 may be selected by the master user and/or another user to start/stop recording of the collaborative browsing session into the recorded sessions 160 (FIG. 1). The recorded sessions 160 may include various data such as, for example, items 136 viewed, network pages visited, time spent viewing an item 136, communications among session participants, and/or other data. The bookmark item component 521 may be used to indicate that the currently rendered item 136 is to be recorded in the bookmarks 157 (FIG. 1) for the session for later retrieval by the leader or other participants.

In this example, the browsing window 303 includes a location component 524 which may display the current uniform resource locator (URL) of a network page that is rendered in the browsing window 303. The URL may correspond to an actual URL of the network page, or it may be a version of the URL that is crafted for use outside of the collaborative browsing interface 172c, e.g., use through a separate window of the browser 169, use in composing an email, use in a link, etc. Additionally, the location component 524 may allow the leader or other user to specify a network site or page to be loaded within the browsing window 303 for collaborative browsing.

Figure 6:
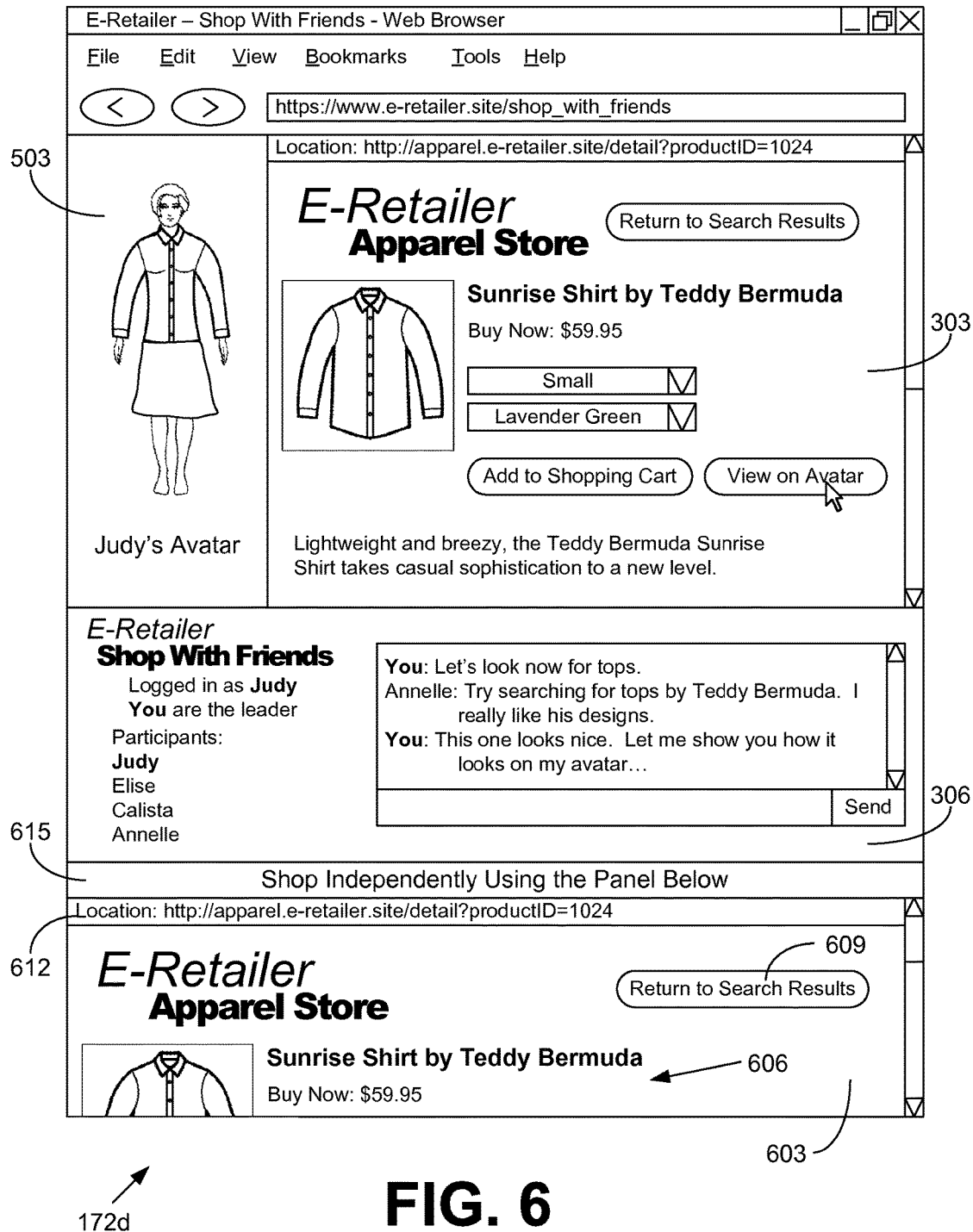

Turning now to FIG. 6, shown is another example of a collaborative browsing interface 172d rendered by a browser 169 (FIG. 1) executed in a client 106 (FIG. 1) in the networked environment 100 (FIG. 1). The example of FIG. 6 differs from the example of FIG. 5 in the respect that an independent browsing window 603 is provided. The independent browsing window 603, which may be a panel or portion of the collaborative browsing interface 172d or a separate window, allows the local user to browse independently of the browsing window 303. For the master user, this means that browsing in the independent browsing window 603 is not replicated to the other users.

In this non-limiting example, the independent browsing window 603 shows a detail network page for the same item 136 (FIG. 1) as in the browsing window 303. The independent browsing window 603 shows item descriptive content 606 and a navigational component 609 merely as an example of content that may be shown within the independent browsing window 603. The independent browsing window 603 may also include a location component 612 for displaying and/or controlling the current network address associated with the independent browsing window 603. Further, the independent browsing window 603 may be rendered in conjunction with an instructional notification 615 that explains to the user, for example, that browsing in the independent browsing window 603 occurs independently from the browsing window 303.

Figure 7:
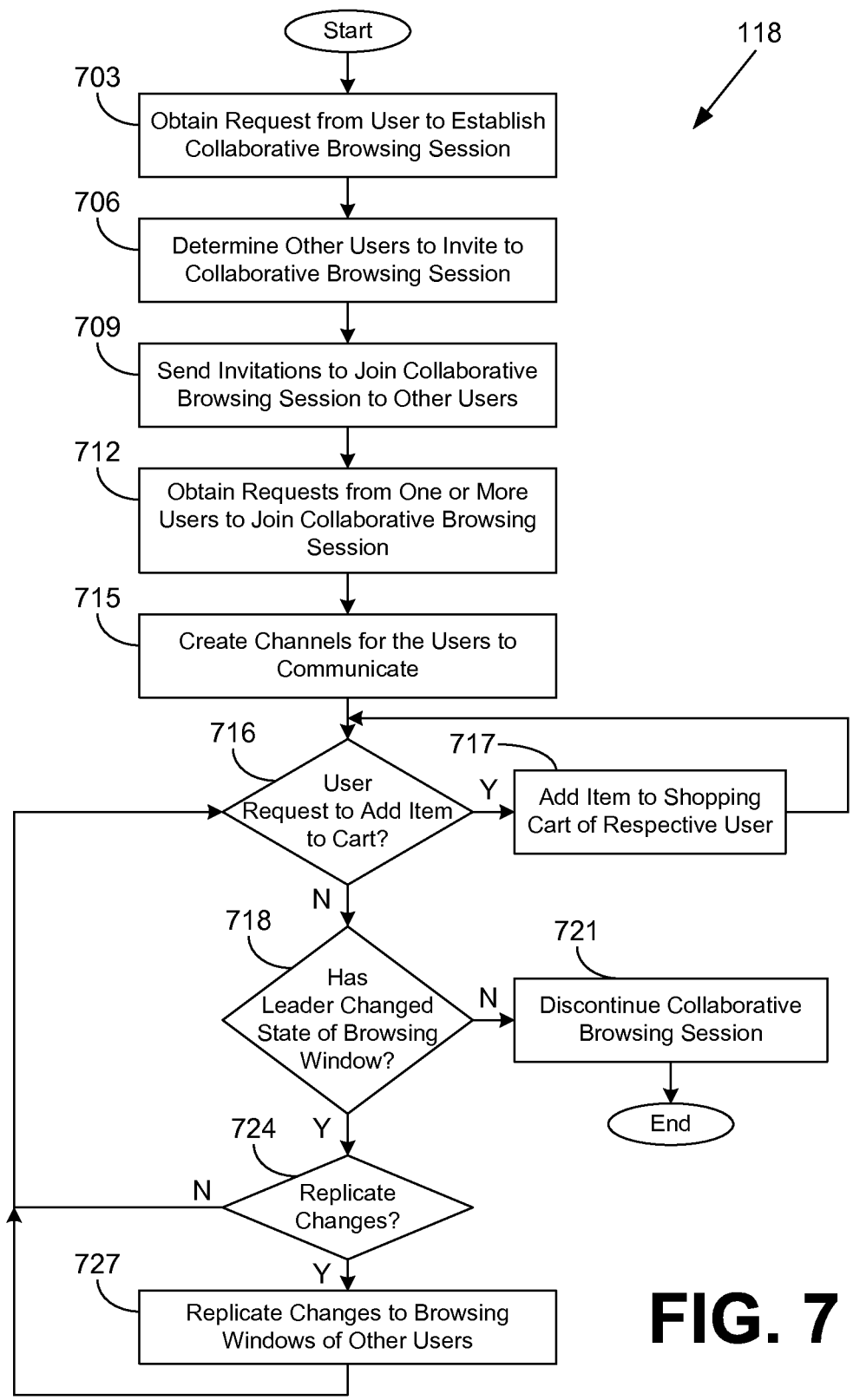
FIG. 7 is a flowchart illustrating one example of functionality implemented as portions of a collaborative browsing service executed in a computing device in the networked environment of FIG. 1 according to various embodiments of the present disclosure.

Referring next to FIG. 7, shown is a flowchart that provides one example of the operation of a portion of the collaborative browsing service 118 according to various embodiments. It is understood that the flowchart of FIG. 7 provides merely an example of the many different types of functional arrangements that may be employed to implement the operation of the portion of the collaborative browsing service 118 as described herein. As an alternative, the flowchart of FIG. 7 may be viewed as depicting an example of steps of a method implemented in the computing device 103 (FIG. 1) according to one or more embodiments.

Beginning with box 703, the collaborative browsing service 118 obtains a request from a user in input data 120 (FIG. 1) from a client 106 (FIG. 1) to establish a collaborative browsing session. The request may specify various preferences 163 (FIG. 1) or may indicate that stored preferences 163 are to be used. In box 706, the collaborative browsing service 118 determines other users to invite to the collaborative browsing session. The listing of the users to invite may be stored in the collaborative session data 130 (FIG. 1) as authorized participants 154 (FIG. 1) or may be obtained based at least in part on the request. In box 709, the collaborative browsing service 118 sends invitations to the users to join the collaborative browsing session. Such invitations may be sent by email, text message, telephone call, network page, etc. In one example, the invitations may include a link that identifies the collaborative browsing session. In another example, a user may log into a network site whereupon the identity of the user and the collaborative browsing session are established.

In box 712, the collaborative browsing service 118 obtains requests from one or more of the users at clients 106 to join the collaborative browsing session. In box 715, the collaborative browsing service 118 creates channels for the users to communicate. As part of this task, the collaborative browsing service 118 may send the collaborative browsing code 133 (FIG. 1) and/or other output data 119 (FIG. 1) to the clients 106 to facilitate generation of the collaborative browsing interfaces 172 (FIG. 1). In some cases, the collaborative browsing code 133 and/or other data may be cached or stored in the clients 106.

In box 716, the collaborative browsing service 118 determines whether a request has been obtained from a user to add an item 136 (FIG. 1) to a shopping cart 139 (FIG. 1) or other list. If such a request has been obtained, the collaborative browsing service 118 proceeds to box 717 and adds the item 136 to the shopping cart 139 or other list of the respective user. The collaborative browsing service 118 may operate in conjunction with the electronic commerce application 115 (FIG. 1) to accomplish this task. It is noted that the user may be the leader of the session or another participant in the session. The collaborative browsing service 118 then continues to box 718. If no such request has been obtained, the collaborative browsing service 118 also continues to box 718.

In box 718, the collaborative browsing service 118 determines whether the leader of the session has changed the state of the master browsing window 303 (FIG. 3). For example, the leader may have launched a new network page to be rendered in the browsing window 303, moved the cursor 320 (FIG. 3), scrolled the browsing window 303, and/or performed another status-changing action. In addition, changes to the state of the browsing window 303 may occur automatically, for example, through document object model (DOM) manipulation as in dynamic hypertext markup language (DHTML) and/or other state changes.

If no status change has occurred and no other usage of the collaborative browsing session is occurring, the session may be determined to be abandoned after expiration of a predefined time period. Accordingly, the collaborative browsing service 118 may move to box 721 and discontinue the collaborative browsing session. Thereafter, the portion of the collaborative browsing service 118 ends.

Otherwise, when a state change occurs, the collaborative browsing service 118 continues to box 724 and determines whether the status change(s) are to be replicated to the other users in the collaborative browsing session. For example, some status changes may be public and are meant to be replicated, while other status changes may be private and not replicated. If the changes are not to be replicated, the collaborative browsing service 118 returns to box 716. However, if the changes are to be replicated, the collaborative browsing service 118 proceeds to box 727 and replicates the changes to the browsing windows 303 of the other users in the collaborative browsing session. Thereafter, the collaborative browsing service 118 returns to box 716.

Figure 8:
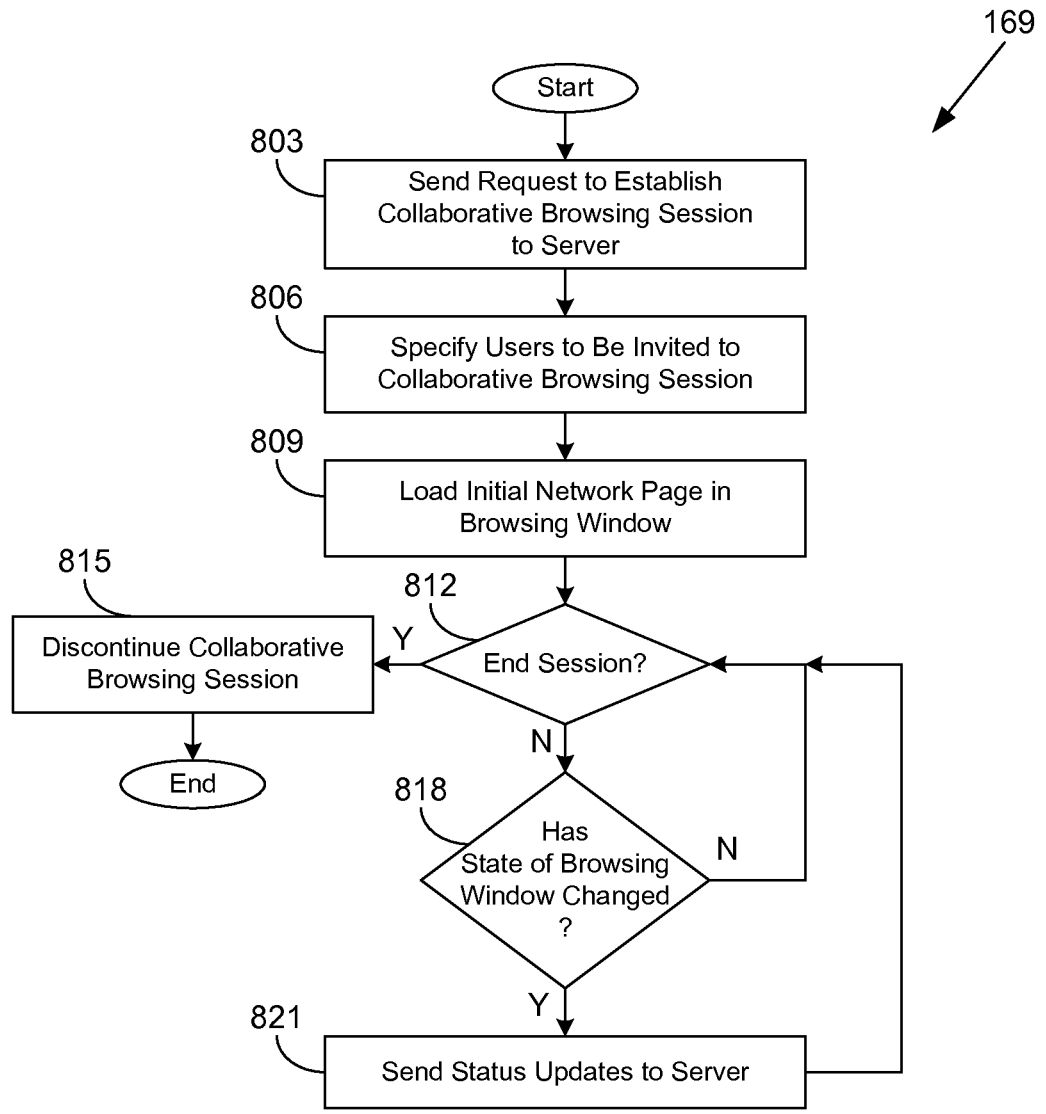
FIGS. 8 and 9 are flowcharts illustrating examples of functionality implemented as portions of a browser executed in a client in the networked environment of FIG. 1 according to various embodiments of the present disclosure.

Continuing on to FIG. 8, shown is a flowchart that provides one example of the operation of a portion of the browser 169 that is executing the collaborative browsing code 133 (FIG. 1) according to various embodiments. The example of FIG. 8 corresponds to a browser 169 controlled by a master user, or leader, of a collaborative browsing session. It is understood that the flowchart of FIG. 8 provides merely an example of the many different types of functional arrangements that may be employed to implement the operation of the portion of the browser 169 as described herein. As an alternative, the flowchart of FIG. 8 may be viewed as depicting an example of steps of a method implemented in the client 106 (FIG. 1) according to one or more embodiments.

Beginning with box 803, the browser 169 sends a request to establish a collaborative browsing session to the collaborative browsing service 118 (FIG. 1) in the computing device 103 (FIG. 1). In box 806, the browser 169 specifies one or more users who are to be invited to join the collaborative browsing session. For example, a user interface 200 as in FIG. 2 may be used for specifying users. In box 809, the browser 169 renders the collaborative browsing interface 172 (FIG. 1) and loads an initial network page into the browsing window 303 (FIG. 3).

In box 812, the browser 169 determines whether the session is to be ended. The session may be ended, for example, in response to input from the leader or in response to a directive from the collaborative browsing service 118. If the session is to be ended, the browser 169 moves to box 815 and discontinues the collaborative browsing session. Thereafter, the portion of the browser 169 associated with the collaborative browsing code 133 ends.

If the session is not to be ended, the browser 169 moves to box 818 and determines whether the state of the browsing window 303 has changed. If the state of the browsing window 303 has not changed, the browser 169 returns to box 812. If the state has changed, the browser 169 proceeds to box 821 and sends a description of the change as a status update to the collaborative browsing service 118. The description of the change may be transmitted as input data 120. It is noted that, in various embodiments, the description of the change does not include graphical display data or any data captured from the display 166 (FIG. 1). Thereafter, the browser returns to box 812 as the session continues.

Figure 9:
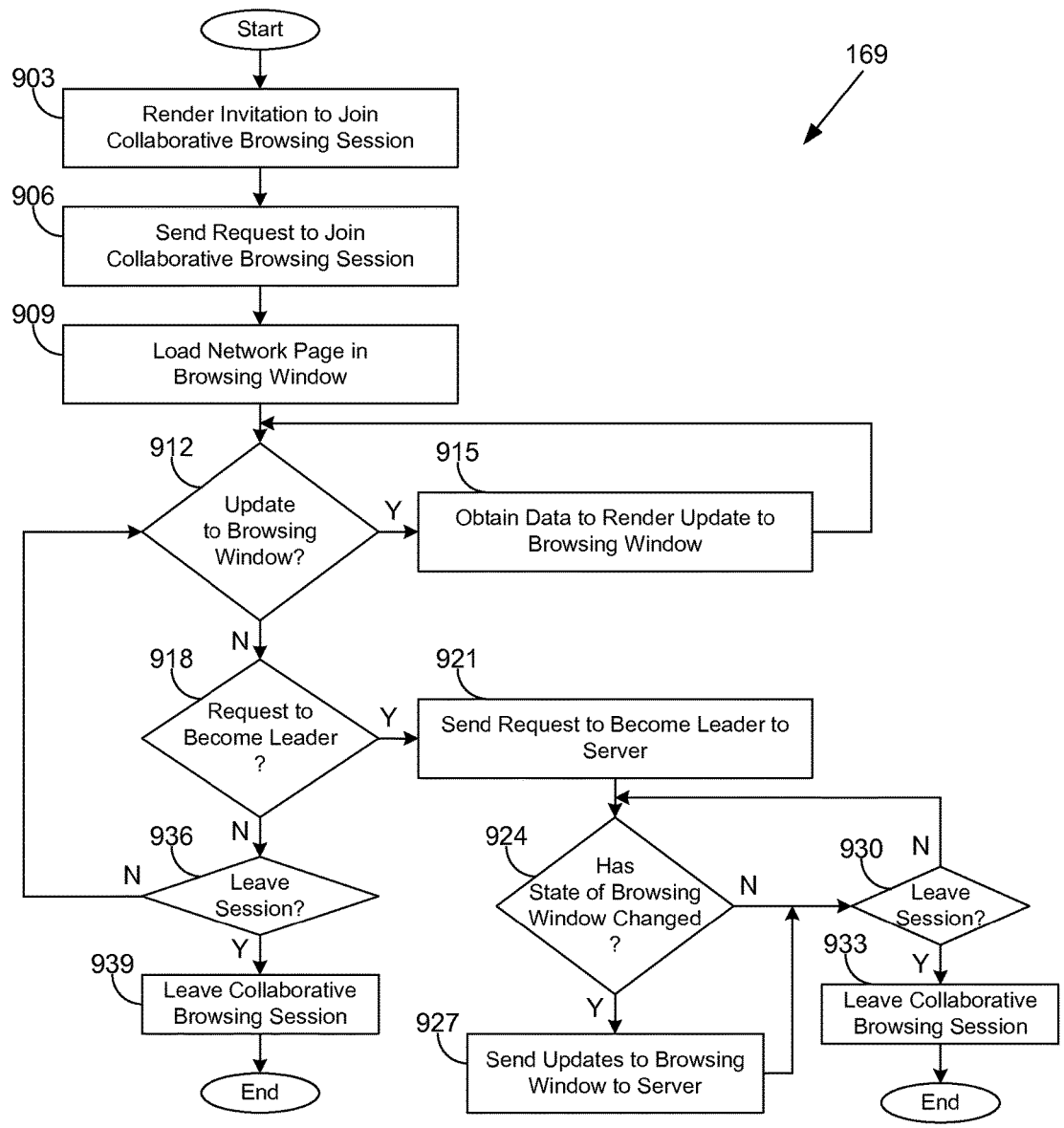

Turning now to FIG. 9, shown is a flowchart that provides another example of the operation of a portion of the browser 169 that is executing the collaborative browsing code 133 (FIG. 1) according to various embodiments. The example of FIG. 9 corresponds to a browser 169 controlled by a user who is initially not a leader of a collaborative browsing session. It is understood that the flowchart of FIG. 9 provides merely an example of the many different types of functional arrangements that may be employed to implement the operation of the portion of the browser 169 as described herein. As an alternative, the flowchart of FIG. 9 may be viewed as depicting an example of steps of a method implemented in the client 106 (FIG. 1) according to one or more embodiments.

Beginning with box 903, the browser 169 renders an invitation to the user at the client 106 to join the collaborative browsing session. When the user accepts the invitation, the browser 169 moves to box 906 and sends a request to join the collaborative browsing session to the collaborative browsing service 118 (FIG. 1) in the computing device 103 (FIG. 1). The browser 169 downloads output data 119 (FIG. 1) from the computing device 103, such as the collaborative browsing code 133 and/or other data to generate a collaborative browsing interface 172 (FIG. 1). Such data may be cached or stored in the client 106 in some cases. In box 909, the browser 169 loads a network page in the browsing window 303 (FIG. 1) of the collaborative browsing interface 172.

Next, in box 912, the browser 169 determines whether an update to the browsing window 303 has occurred. For example, the master user may have scrolled the browsing window 303, moved the cursor 320 (FIG. 1), loaded another network page, or performed some action resulting in a status change. Alternatively, a status change may have been automatically initiated. If an update to the browsing window 303 is to be made, the browser 169 obtains data to render the update to the browsing window 303 in box 915.

If no update is occurring, the browser 169 instead moves to box 918 and determines whether the user at the client 106 has requested to become the leader of the session. For example, the user may select a leader control component 406 (FIG. 4) or some other component. If the user has requested to become the leader, the browser 169 sends a request for the user to become the leader to the collaborative browsing service 118 in box 921. After becoming the leader, the browser 169 continues to box 924.

In box 924, the browser 169 determines whether the state of the browsing window 303 has changed. At this point, the user is the leader of the session and is in control of the browsing window 303. If the state has changed, the browser 169 moves to box 927 and sends data relating to updates of the browsing window 303 to the collaborative browsing service 118. The browser 169 then proceeds to box 930. If the state has not changed, the browser 169 also proceeds to box 930.

In box 930, the browser 169 determines whether the user is leaving the session. If the user is not leaving the session, the browser 169 returns to box 924. If the user is leaving the session, the browser 169 continues to box 933 and leaves the collaborative browsing session. In some cases, the task of box 933 may correspond to relinquishing the leader position and/or joining as another user. Thereafter, the portion of the browser 169 associated with the collaborative browsing code 133 ends.

Otherwise, if the browser 169 determines in box 918 that the user is not requesting to become the leader, the browser 169 continues to box 936. In box 936, the browser 169 determines whether the user is to leave the session. If the user is not to leave the session, the browser 169 returns to box 912. If the user is to leave the session, the browser 169 moves to box 939 and leaves the collaborative browsing session. Thereafter, the portion of the browser 169 associated with the collaborative browsing code 133 ends.

Figure 10:
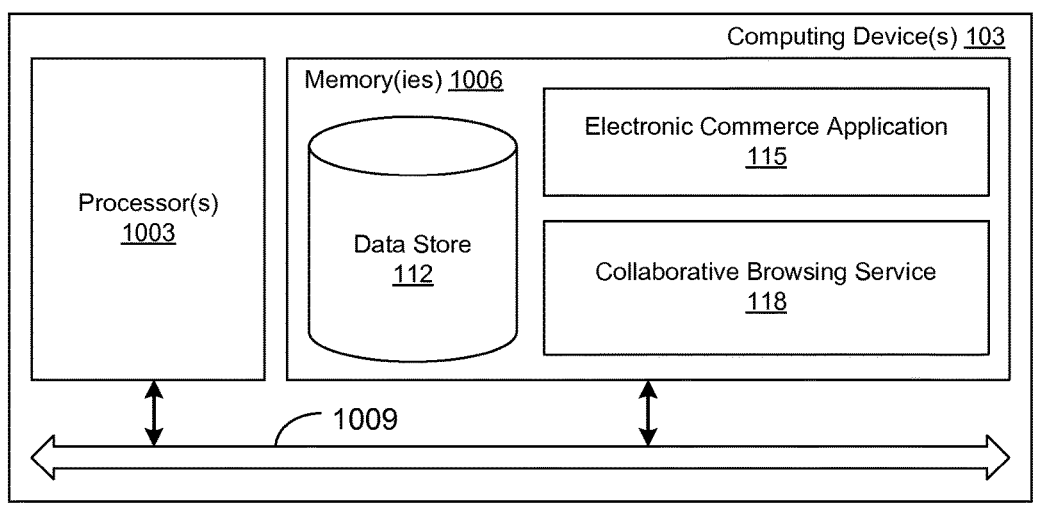
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the electronic commerce application 115, the collaborative browsing service 118, and potentially other applications. Also stored in the memory 1006 may be a data store 112 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the electronic commerce application 115, the collaborative browsing service 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show the functionality and operation of an implementation of portions of the collaborative browsing service 118 and the browser 169 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. Further, in some embodiments, one or more of the blocks shown in FIGS. 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, the collaborative browsing service 118, the browser 169, and the collaborative browsing code 133 (FIG. 1), that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium comprising a program that, when executed, causes a first computing device to at least:
    establish a collaborative browsing session in which a plurality of users are to participate using respective ones of a plurality of second computing devices; and
    send code that renders a collaborative browsing interface to the plurality of second computing devices, the code that renders the collaborative browsing interface, when executed, causing the respective ones of the plurality of second computing devices to at least:
        render a browsing window that facilitates collaborative browsing of a network site by the plurality of users;
        facilitate a selection of a leader of the collaborative browsing session from the plurality of users in the collaborative browsing session; and
        replicate a status change in the browsing window in response to receiving an indication of the status change, wherein the status change comprises at least one of: a movement of a cursor within the browsing window by the leader, a scrolling of a viewport of the browsing window by the leader, or a modification of a document object model (DOM) associated with the browsing window, wherein the first computing device records data describing a sequence of status changes in the collaborative browsing session in response to a user input to a toggle user interactive element.

2. The non-transitory computer-readable medium of claim 1, wherein the first computing device is further configured to at least:
    establish the collaborative browsing session before any of the plurality of users is identified; and
    permit any user to join the collaborative browsing session.

3. The non-transitory computer-readable medium of claim 1, wherein the first computing device is further configured to at least:
    determine a user who is to be invited to the collaborative browsing session; and
    send an invitation to join the collaborative browsing session to the user, the invitation including a link to a network page associated with the first computing device, the link identifying the collaborative browsing session.

4. The non-transitory computer-readable medium of claim 1, wherein the indication of the status change comprises non-graphical-screen-capture data.

5. A system comprising:
    a first computing device including a processor configured to at least:
        establish a collaborative browsing session in which a plurality of users are to participate using respective ones of a plurality of second computing devices;

determine a user who is to be invited to the collaborative browsing session;

send an invitation to join the collaborative browsing session to a communication address associated with the user; and send code that renders a collaborative browsing interface to the plurality of second computing devices, the code that renders the collaborative browsing interface, when executed, causing the respective ones of the plurality of second computing devices to at least:

render, in the collaborative browsing interface, a browsing window that facilitates collaborative browsing of a network site by the plurality of users;

facilitate a selection of a leader of the collaborative browsing session from the plurality of users in the collaborative browsing session; and send data corresponding to a status change for the browsing window to the first computing device, wherein the status change comprises at least one of: a movement of a cursor within the browsing window by a first user of the plurality of users, a scrolling of a viewport of the browsing window by the first user, or a modification of a document object model (DOM) associated with the browsing window, wherein the first computing device records data describing a sequence of status changes in the collaborative browsing session in response to a user input to a toggle user interactive element.

6. The system of claim 5, wherein the first computing device is further configured to at least:

establish the collaborative browsing session before any of the plurality of users is identified; and permit any user to join the collaborative browsing session.

7. The system of claim 5, wherein sending the invitation includes sending a link to a network page associated with the first computing device, the link identifying the collaborative browsing session.

8. The system of claim 5, wherein the first user corresponds to the leader of the collaborative browsing session.

9. The system of claim 5, wherein the first computing device is further configured to at least facilitate communication among the plurality of users participating in the collaborative browsing session.

10. The system of claim 9, wherein the communication corresponds to a communication session selected from the group consisting of: a text communication session, an audio communication session, and a video communication session.

11. The system of claim 5, wherein the first computing device is further configured to at least send a request for the first computing device to control the collaborative browsing session.

12. The system of claim 5, wherein the first computing device is further configured to at least present a communication from one of the plurality of users in the collaborative browsing interface.

13. A method comprising:

establishing, by a processor of a first computing device, a collaborative browsing session in which a plurality of users are to participate using respective ones of a plurality of second computing devices, the collaborative browsing session being established before any of the plurality of users is identified;

causing, by a processor of at least one of the plurality of second computing devices, a collaborative browsing interface to be rendered, in response to code received from the first computing device, that facilitates participation in the collaborative browsing session by the plurality of users, the collaborative browsing interface including a browsing window configured to facilitate collaborative browsing of a network site;

facilitating, by the processor of the at least one of the plurality of second computing devices, a selection of a leader of the collaborative browsing session from the plurality of users in the collaborative browsing session; and replicating, by the processor of the at least one of the plurality of second computing devices, a status change in the browsing window in response to receiving an indication of the status change, wherein the status change comprises at least one of: a movement of a cursor within the browsing window by a first user of the plurality of users, a scrolling of a viewport of the browsing window by the first user, or a modification of a document object model (DOM) associated with the browsing window, wherein the first computing device records data describing a sequence of status changes in the collaborative browsing session in response to a user input to a toggle user interactive element.

14. The method of claim 13, wherein the indication of the status change comprises non-graphical-screen-capture data.

15. The method of claim 13, further comprising:

establishing, by the processor of the first computing device, the collaborative browsing session before any of the plurality of users is identified; and permitting, by the processor of the first computing device, any user to join the collaborative browsing session.

16. The method of claim 13, further comprising:

determining, by the processor of the first computing device, a user who is to be invited to the collaborative browsing session; and sending, by the processor of the first computing device, an invitation to join the collaborative browsing session to a communication address associated with the user, the invitation including a link to a network page associated with the first computing device, the link identifying the collaborative browsing session.

17. The method of claim 13, wherein the first user corresponds to the leader of the collaborative browsing session.

18. The method of claim 13, further comprising facilitating, by the processor of the first computing device, communication among the plurality of users participating in the collaborative browsing session.

19. The method of claim 13, wherein the sequence of status changes includes at least one of: one or more network pages visited, an amount of time spent viewing an item, or one or more communications among the plurality of users.

20. The method of claim 13, further comprising sending, by the processor of the first computing device, a request for the first computing device to control the collaborative browsing session.

* * * * *